(12) United States Patent
Avinger (10) Patent No.: US 6,234,434 B1
(45) Date of Patent: May 22, 2001

(54) FOLDING POLE STAND

(75) Inventor: Andrew G. Avinger, Lubbock, TX (US)

(73) Assignee: Gary Products Group, Inc., Lubbock, TX (US)

( * ) Notice: Subject to any disclaimer, the term of this patent is extended or adjusted under 35 U.S.C. 154(b) by 0 days.

(21) Appl. No.: 09/499,784

(22) Filed: Feb. 8, 2000

(51) Int. Cl.[7] .................................................. F16M 11/32
(52) U.S. Cl. ....................................... 248/188.7; 248/528
(58) Field of Search ............................. 248/188.6, 188.7, 248/519, 523, 528, 529, 539, 541; 47/40.5; 403/157, 364

(56) References Cited

U.S. PATENT DOCUMENTS

| 430,970 | 6/1890 | Reed | 211/167 |
|---|---|---|---|
| 1,644,807 | 10/1927 | Zeigler | 248/526 |
| 4,007,901 | 2/1977 | Mancini et al. | 248/526 |
| 4,286,409 | 9/1981 | Taylor et al. | 47/40.5 |

*Primary Examiner*—Ramon O. Ramirez
*Assistant Examiner*—Jon A Szumny
(74) *Attorney, Agent, or Firm*—Locke Liddell & Sapp LLP (57) ABSTRACT

A foldable stand for supporting a cylindrical shaft, the stand being operable between a folded position and a stand support position for supporting the shaft includes first, second, third, and fourth hingedly connected legs. The first and second legs are disposed generally parallel to each other in the folded position and generally perpendicular to each other in the support position. The third and fourth legs are disposed generally parallel to each other in the folded position and generally perpendicular to each other in the support position. Each leg includes a hinge member that is pivotally connected to an adjacent leg. The second and fourth legs include a receptacle adapted to receive the shaft in the stand support position.

10 Claims, 10 Drawing Sheets

FOLDING POLE STAND

TECHNICAL FIELD OF THE INVENTION

The present invention relates to stands for securing cylindrical objects, and more particularly to stands for trees such as artificial Christmas trees, providing for a stand that is foldable to a compact configuration when not in use, and is simple in operation.

BACKGROUND OF THE INVENTION

Stands, such as for example, stands for use in supporting an artificial Christmas tree, flags, or banners are well known. Typically, such stands have multiple legs and require assembly for use. Additionally, because of the multiple components, pole stands require considerable space for storage when not in use.

A need has thus arisen for a compact pole stand requiring minimal assembly. Additionally, a need has arisen for a pole stand that folds to a configuration that is flat and compact for storage.

SUMMARY OF THE INVENTION

In accordance with the present invention, a foldable stand for supporting a cylindrical shaft, the stand being operable between a folded position and a stand support position for supporting the shaft is provided. The stand includes first, second, third, and fourth hingedly connected legs. The first and second legs are disposed generally parallel to each other in the folded position and generally perpendicular to each other in the support position. The third and fourth legs are disposed generally parallel to each other in the folded position and generally perpendicular to each other in the support position. Each leg includes a hinge member that is pivotally connected to an adjacent leg. The second and fourth legs include a receptacle adapted to receive the shaft in the stand support position.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
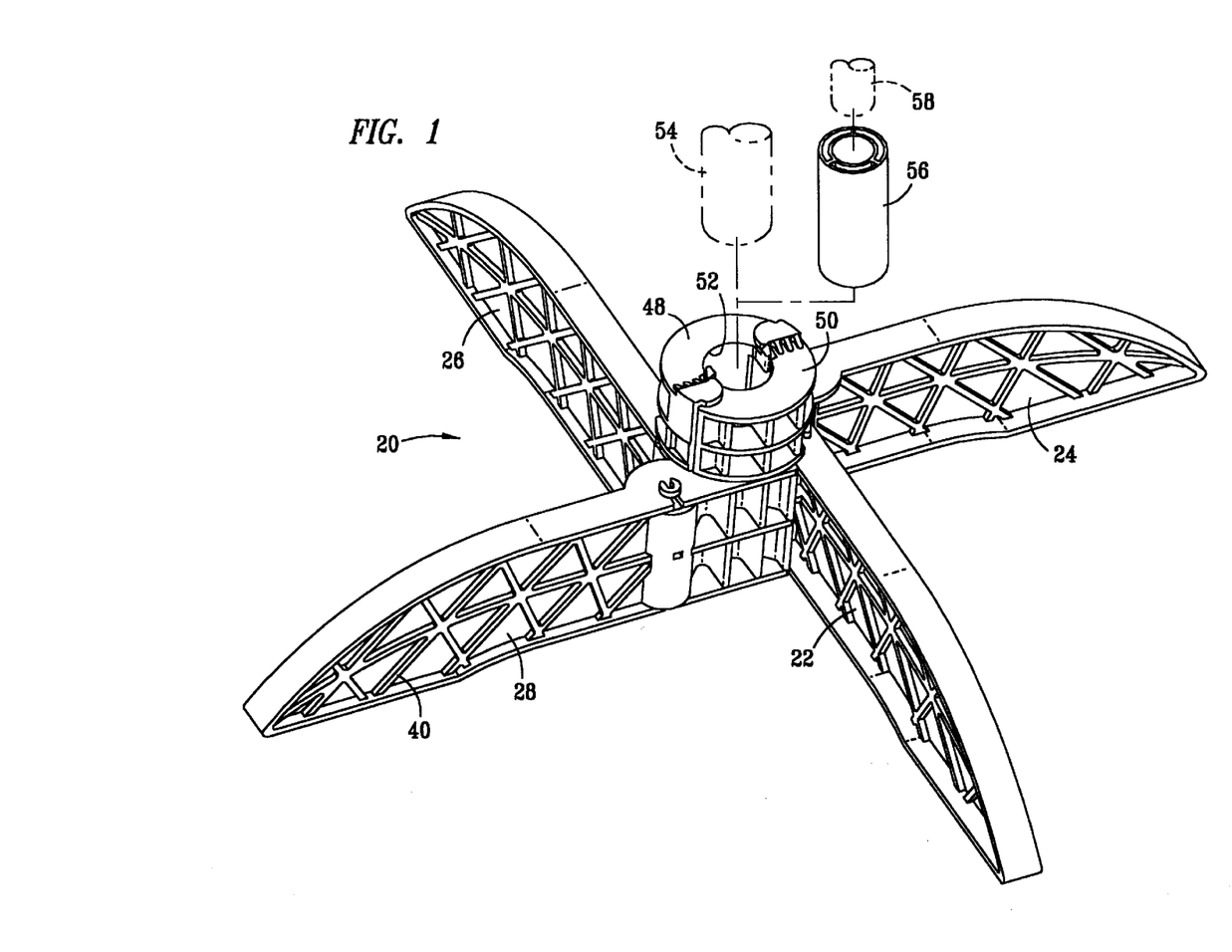
FIG. 1 is a perspective view of the present pole stand in the stand support position and illustrating poles of two diameters and an adapter.
Figure 2:
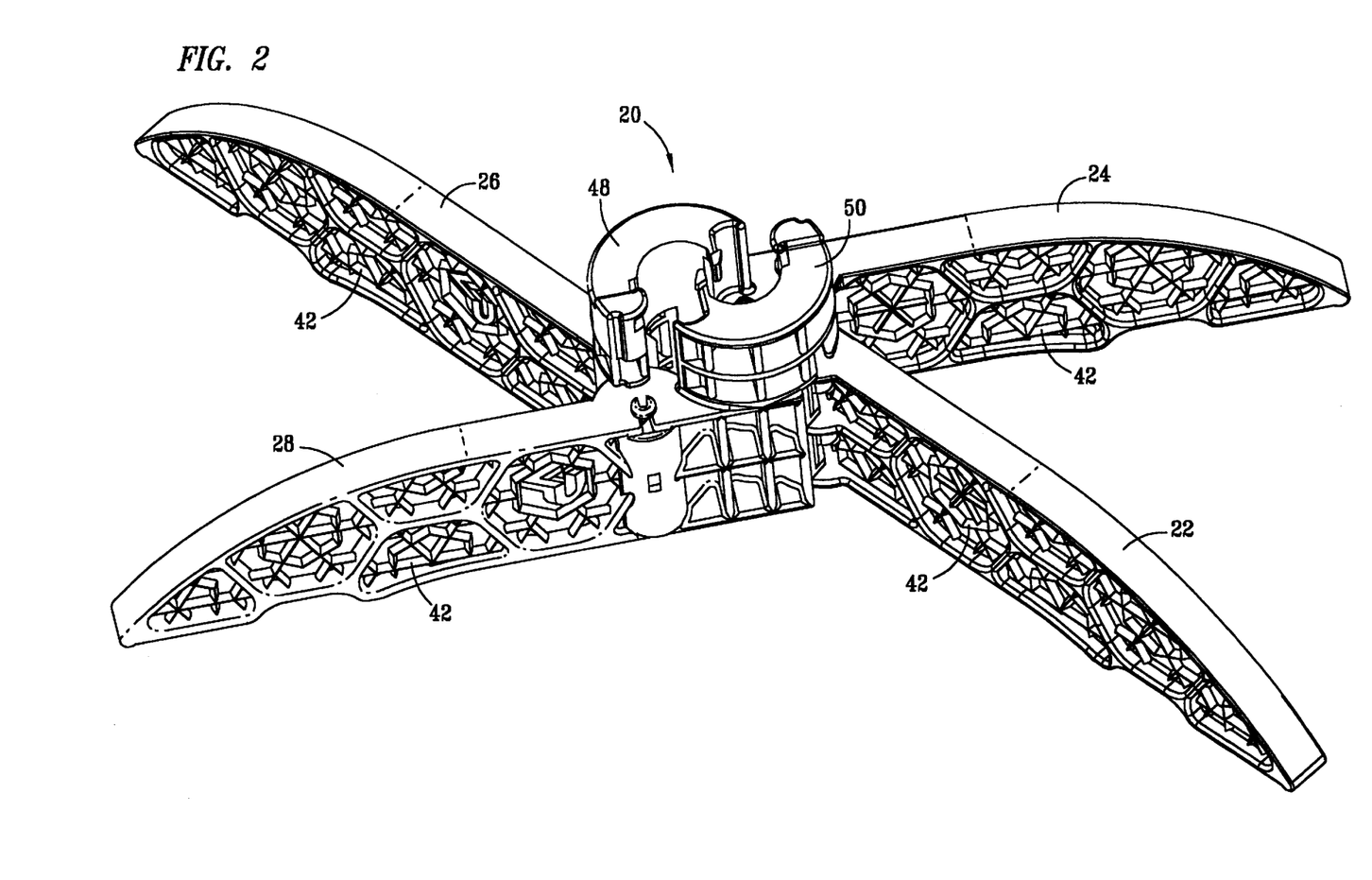
FIG. 2 is a perspective view of the present pole stand illustrated in FIG. 1 in a partially folded position.
Figure 3:
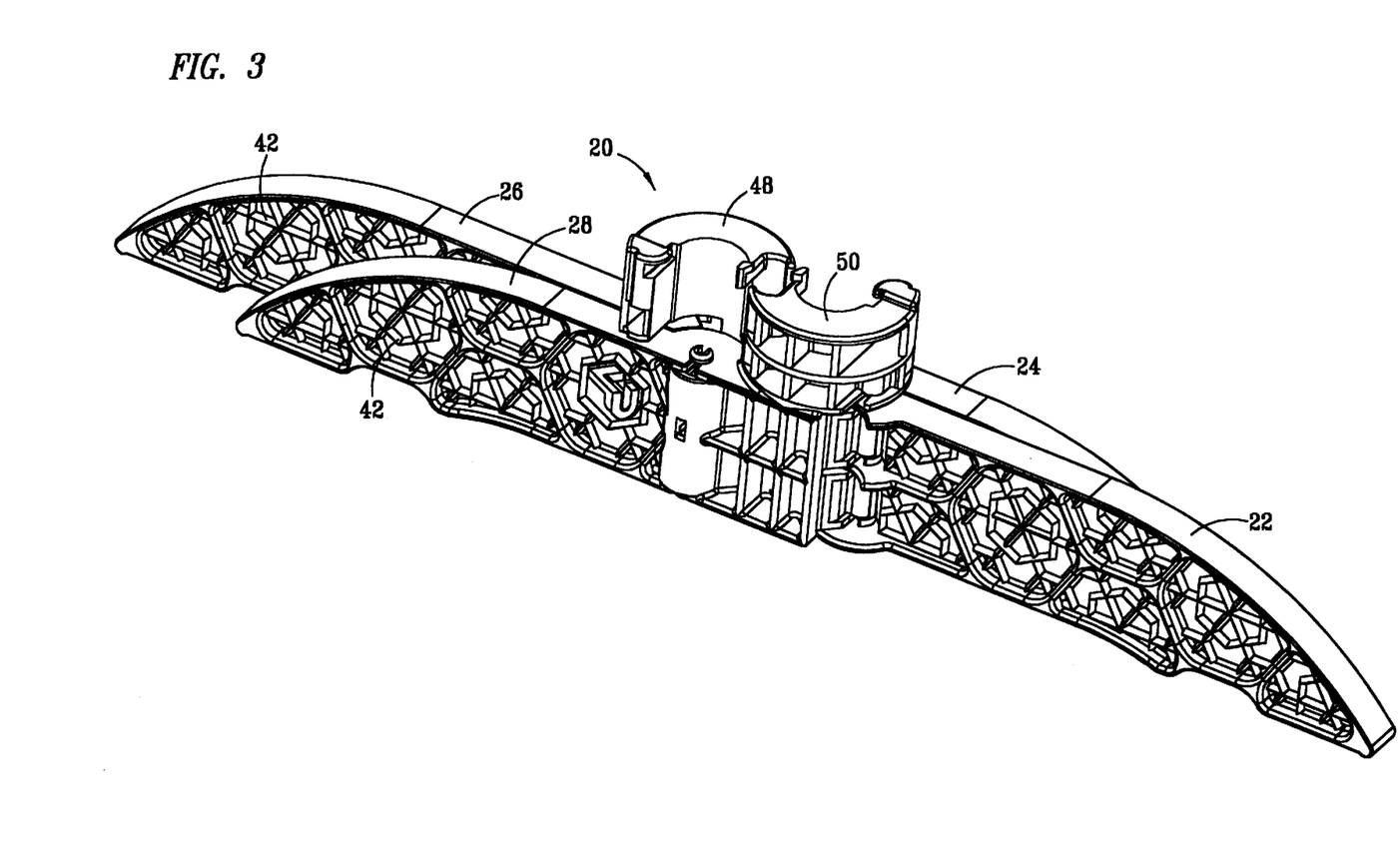
FIG. 3 is a perspective view of the present pole stand illustrated in FIG. 1 in a folded position.

Referring simultaneously to FIGS. 1–4, the present folding pole stand is illustrated, and is generally identified by the numeral 20. Pole stand 20 includes four hingedly connected legs 22, 24, 26, and 28. Pole stand 20 is operable between a stand support position as illustrated in FIG. 1 and a folded position as illustrated in FIG. 3. Pole stand 20 is foldable by rotating legs 22 and 24 towards each other and by rotating legs 26 and 28 towards each other as illustrated in FIG. 2 wherein pole stand 20 is partially folded. Legs 22, 24, 26, and 28 are hingedly attached in the stand support position (FIG. 1) as well as in the folded position (FIG. 3) such that no assembly or disassembly for storage is required. FIG. 3 illustrates pole stand 20 in the folded position which is a flat and compact configuration requiring minimal storage space.

Figure 4:
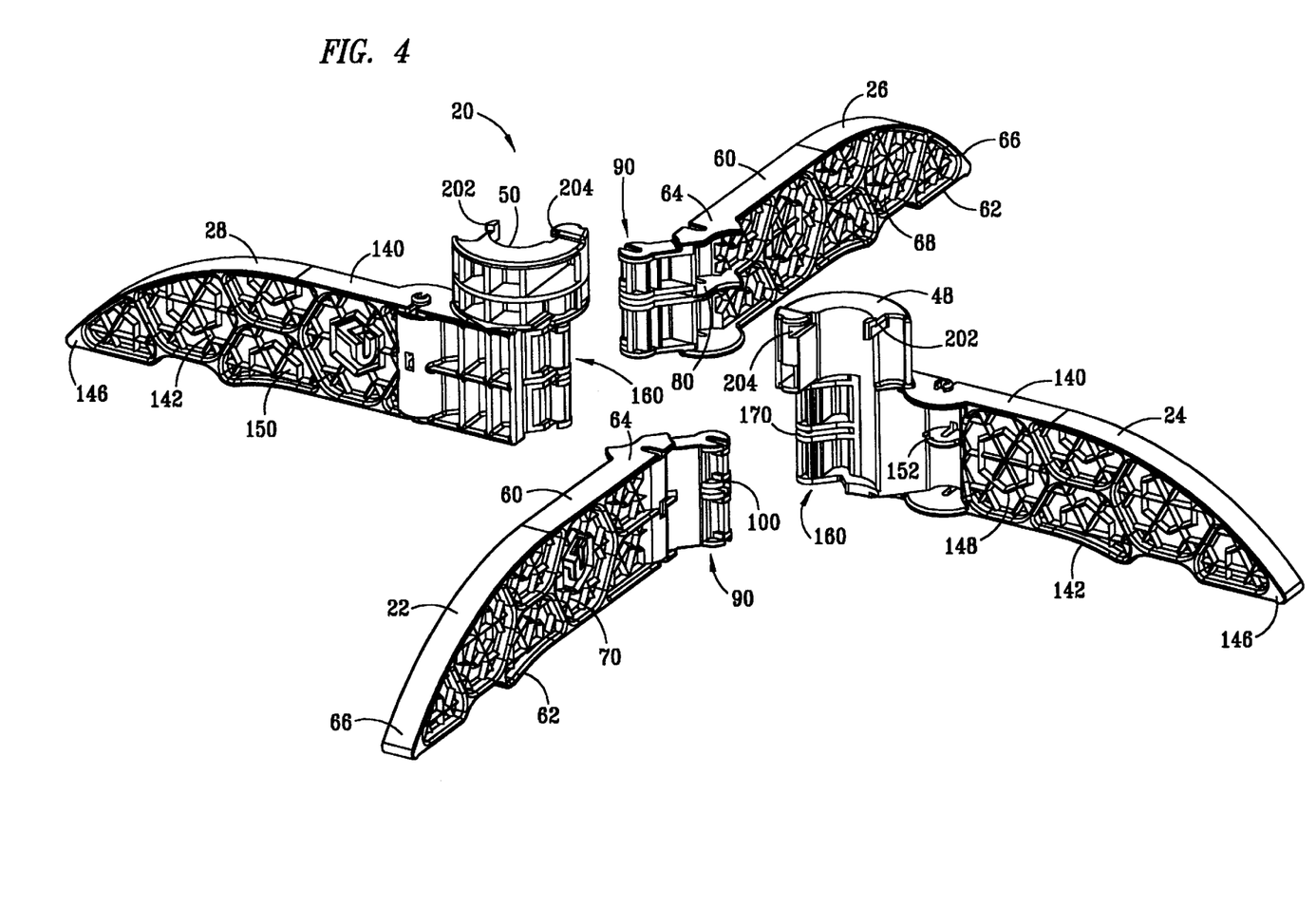
FIG. 4 is an exploded perspective view of the present pole stand illustrated in FIG. 1.
Figure 5:
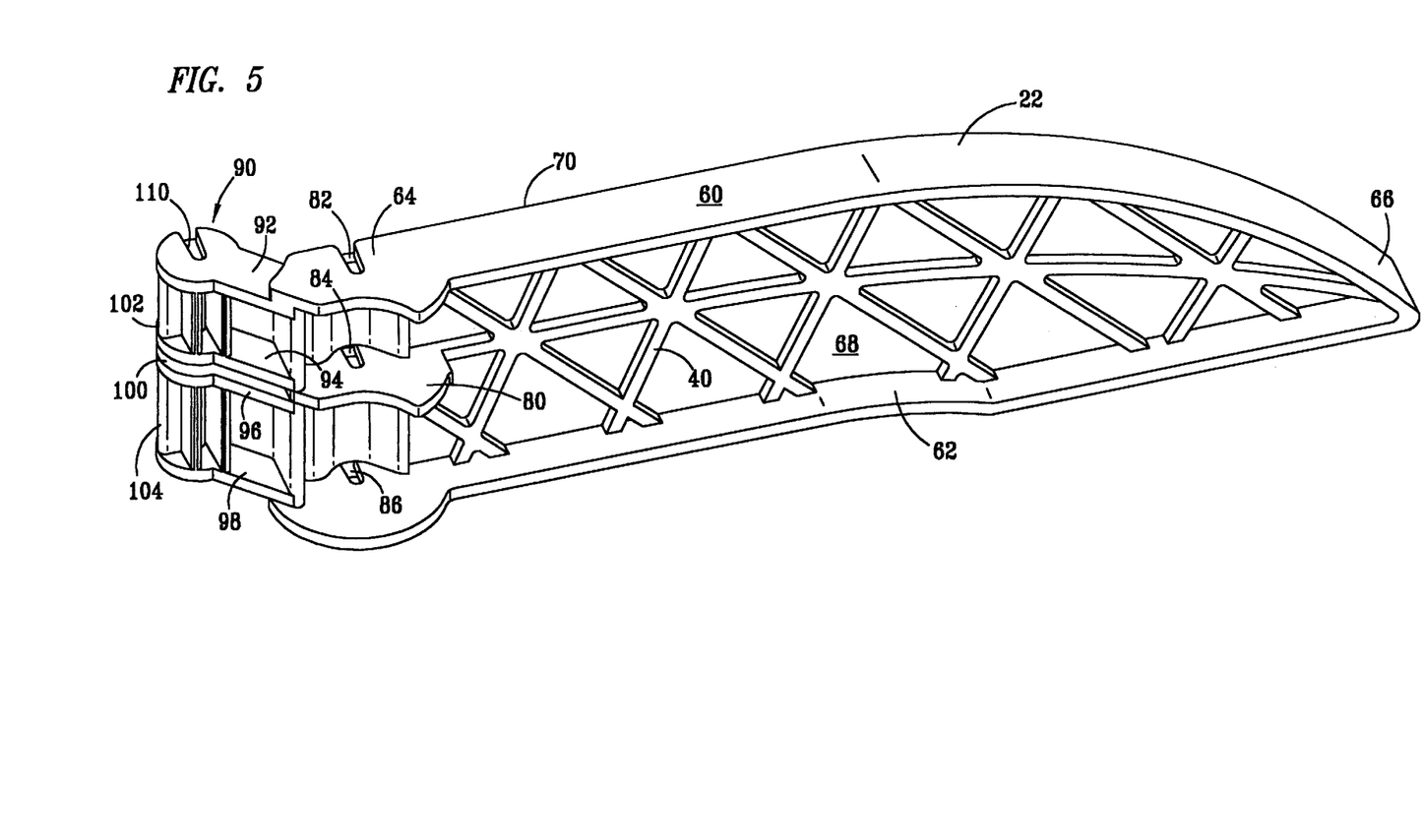
FIG. 5 is a perspective view of a leg of a first pair of legs of the pole stand illustrated in FIG. 1.
Figures 6, 7, 8:
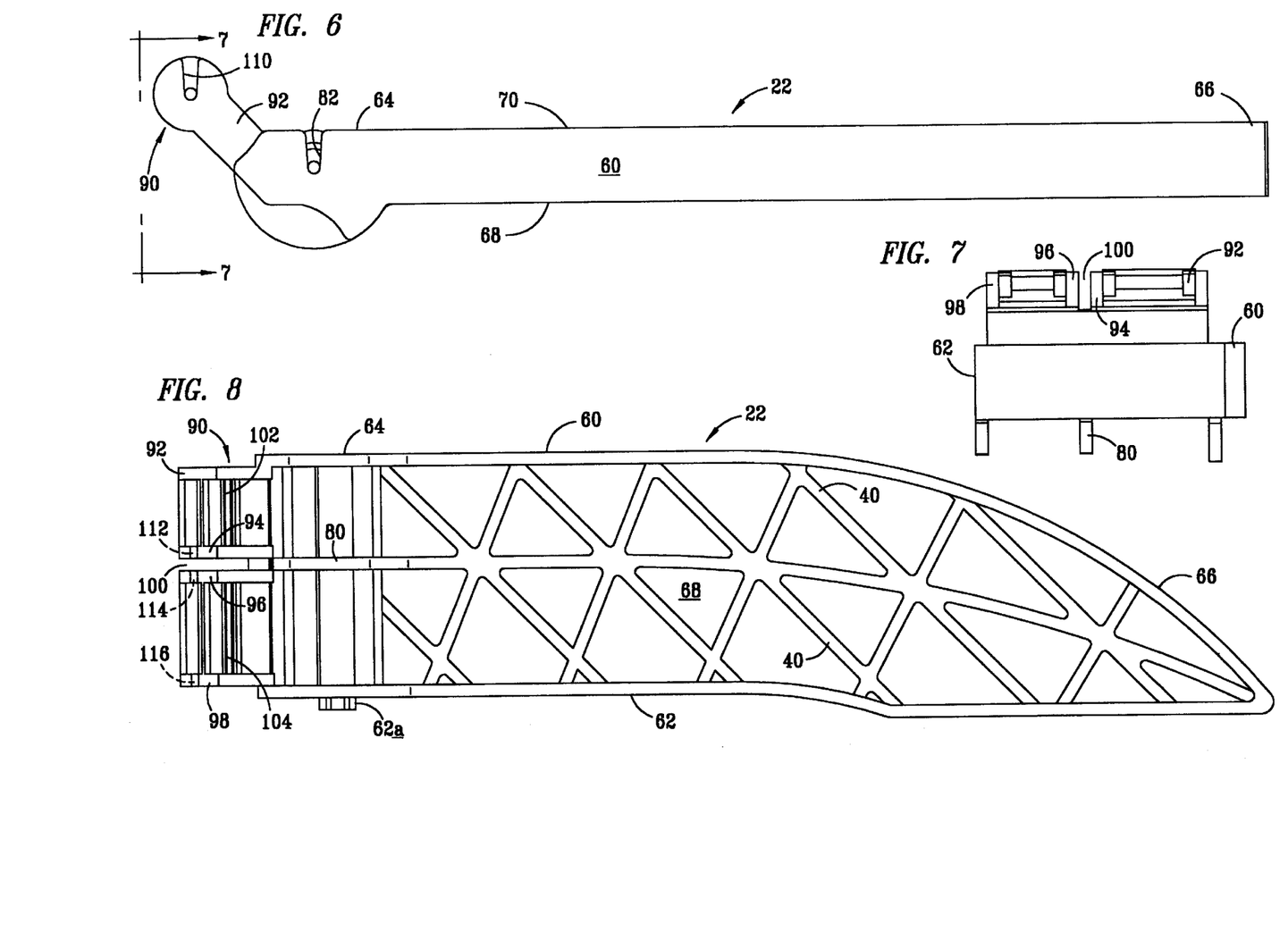
FIG. 6 is a top plan view of the leg shown in FIG. 5.
FIG. 7 is an end view taken generally along lines 7—7 of FIG. 6.
FIG. 8 is a side elevational view of the leg shown in FIG. 5.
Figures 9, 10:
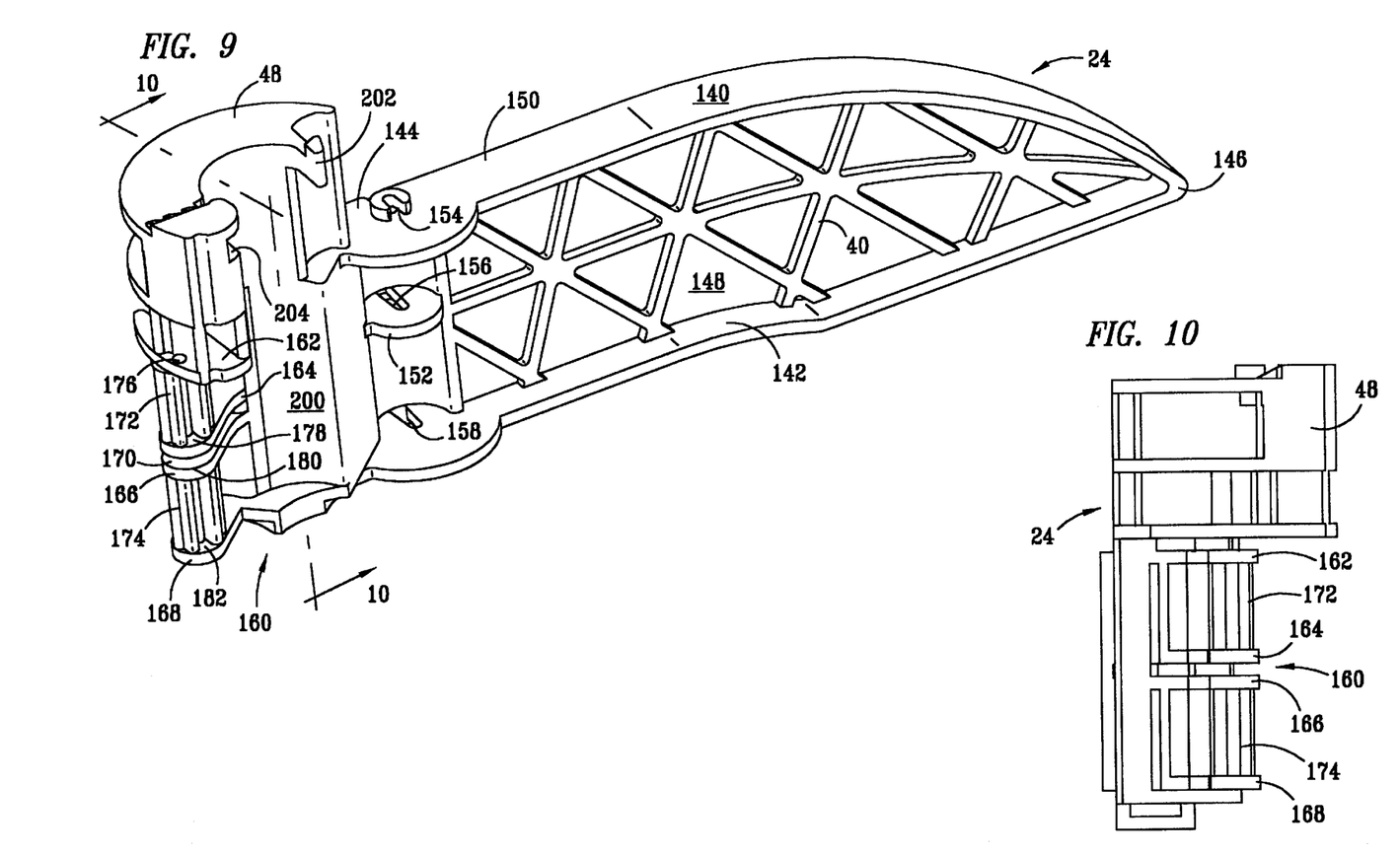
FIG. 9 is a perspective view of a leg of a second pair of legs of the pole stand illustrated in FIG. 1.
FIG. 10 is an end view taken generally along lines 10—10 of FIG. 9.
Figure 11:
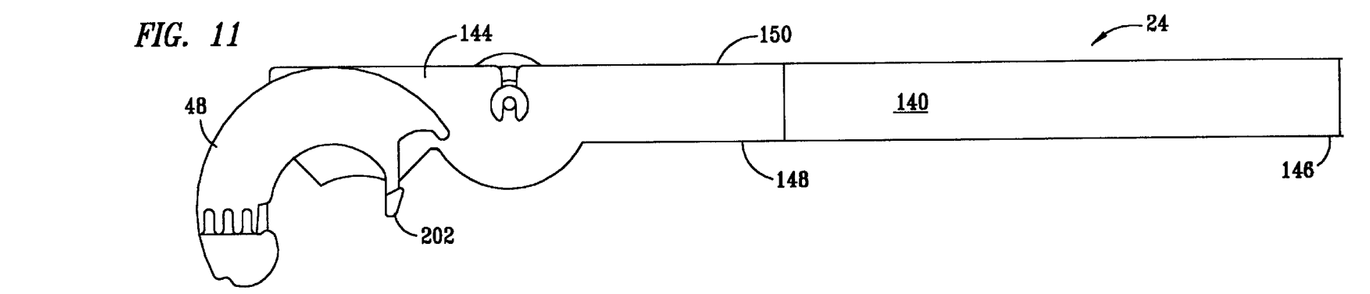
FIG. 11 is a top plan view of the leg shown in FIG. 9.
Figure 12:
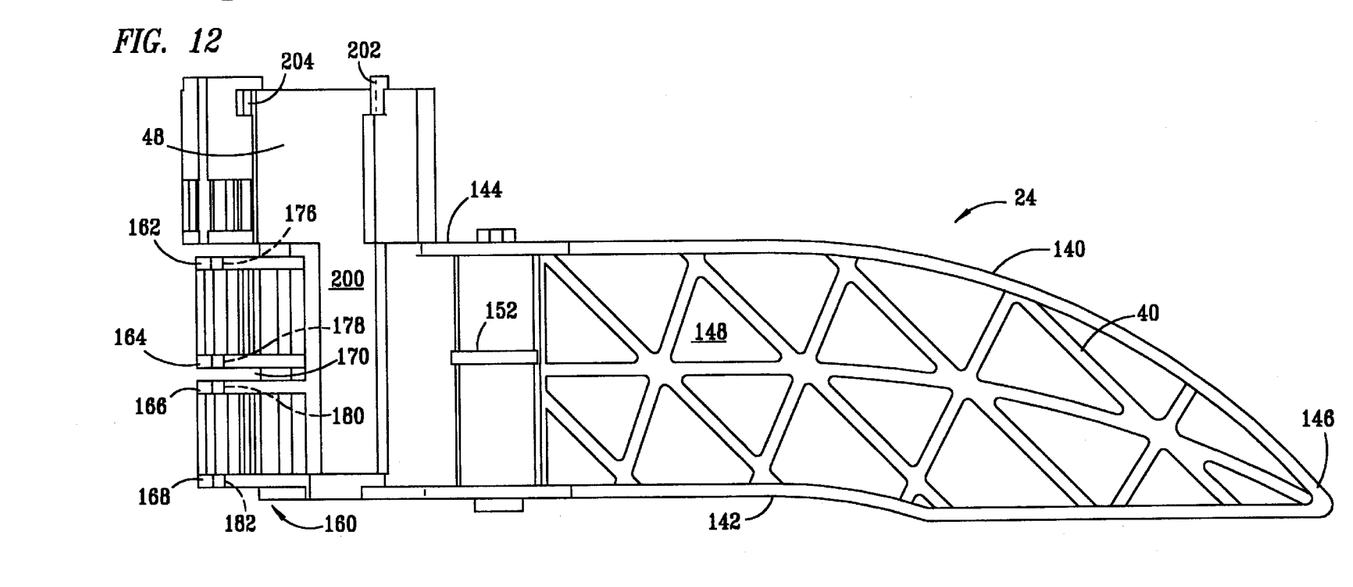
FIG. 12 is a side elevational view of the leg shown in FIG. 9.

FIG. 1 illustrates legs 22, 24, 26, and 28 as having a reinforcing rib pattern of triangular webs 40 whereas FIGS. 2–4 illustrate a reinforcing rib pattern configured as "snowflakes" 42, it being understood that the reinforcing ribs 40 and 42 are shown for illustrative purposes only, for providing additional support to legs 22, 24, 26, and 28, and additional patterns may be utilized well know to those skilled in the art.

Legs 24 and 28 include a semi-circular collar member 48 and 50, respectively. When pole stand 20 is in the stand support position (FIG. 1), collar members 48 and 50 mate to form an aperture 52 through which a pole 54 is inserted. Pole 54 may comprise, for example, a base pole of an artificial Christmas tree, a pole for supporting a flag or banner, or any other type of cylindrical object to be supported on a support surface. Pole stand 20 accommodates poles 54 of a variety of diameters by utilizing an adapter 56 which is insertable into aperture 52 in order to reduce the diameter of aperture 52, and thereby accommodate poles, such as for example, a pole 58, having a diameter less that the diameter of pole 54.

Referring now to FIGS. 4 and 5–8, the configuration of legs 22 and 26 will now be described. FIGS. 5–8 illustrate leg 22, it being understood that leg 26 is substantially identical to leg 22, and when reference is made to leg 22, it is understood that the similar reference numerals will be utilized for leg 26. Legs 22 and 26 each include a top wall 60, a bottom wall 62, a first end 64, a second end 66, a first side wall 68, and a second side wall 70. Extending from side wall 68 is a mounting plate 80. Mounting plate 80 is disposed between top wall 60 and bottom wall 62 of legs 22 and 26 and is generally parallel to top wall 60 and bottom wall 62. Top wall 64, mounting plate 80, and bottom wall 62 include an aperture 82, 84, and 86, respectively, which receive a pin 88 (FIG. 14) inserted through bottom wall 62 for hingedly joining leg 22 to leg 28 and leg 26 to leg 24 as well be subsequently be described with respect to FIG. 14.

Extending from end 64 of legs 22 and 26 is a hinge member, generally identified by the numeral 90. Hinge member 90 includes plates 92, 94, 96, and 98. Plates 94 and 96 are spaced apart by a slot 100. A web 102 interconnects plates 92 and 94. A web 104 interconnects plates 96 and 98. As more clearly illustrated in FIG. 8, plate 92 includes an aperture 110, plate 94 includes an aperture 112, plate 96 includes an aperture 114, and plate 98 includes an aperture 116. Apertures 110, 112, 114, and 116 receive a pin 120 (FIG. 13) inserted through the bottom of hinge 90 of legs 24 and 28 for hingedly joining hinge 90 of leg 22 to leg 24 and hingedly joining hinge 90 of leg 26 to leg 28, as will be subsequently be described with respect to FIG. 13.

Referring now to FIG. 4 and FIGS. 9–12, legs 24 and 28 will now be described. Legs 24 and 28 are identical in configuration, and similar reference numerals will be utilized for like and corresponding components. Legs 24 and 28 include a top wall 140, and bottom wall 142, a first end 144, a second end 146, a first side wall 148, and second side wall 150. Extending from side wall 148 of legs 24 and 28 is a mounting plate 152. Mounting plate 152 is disposed between top wall 140 and bottom wall 142 and is generally parallel to top wall 144 and bottom wall 142. Top wall 140 includes an aperture 154. Mounting plate 152 includes an aperture 156. Bottom wall 142 includes an aperture 158. Apertures 154, 156, and 158 are aligned to receive pin 120 (FIG. 13) through bottom wall 142 for hingedly mounting leg 22 to leg 24 and leg 26 to leg 28 via hinge members 90.

Extending from first end 144 of legs 24 and 28 is a hinge member 160. Hinge member 160 includes plates 162, 164, 166, and 168. Plates 164 and 166 are spaced apart by a slot 170. Plates 162 and 164 are interconnected by a web 172. Plates 166 and 168 are interconnected by a web 174. Plates 162, 164, 166 and 168 each include an aperture 176, 178, 180, and 182 (FIG. 12), respectively, for receiving pin 88 for mounting leg 24 to leg 26 and for mounting leg 28 to leg 22 via hinge members 160.

Disposed between first end 144 of legs 24 and 28 and hinge member 160 is a pole receptacle 200. Pole receptacle 200 is aligned with aperture 52 (FIG. 1) and receives pole 54. Pole 54 extends through legs 24 and 28 to bottom wall 142.

Collar members 48 and 50 each include a locking tab 202 for mating with a corresponding slot 204. Locking tabs 202 and slots 204 function to lock collar members 48 and 50 together for snugly holding pole 54 within stand 20.

Figure 13:
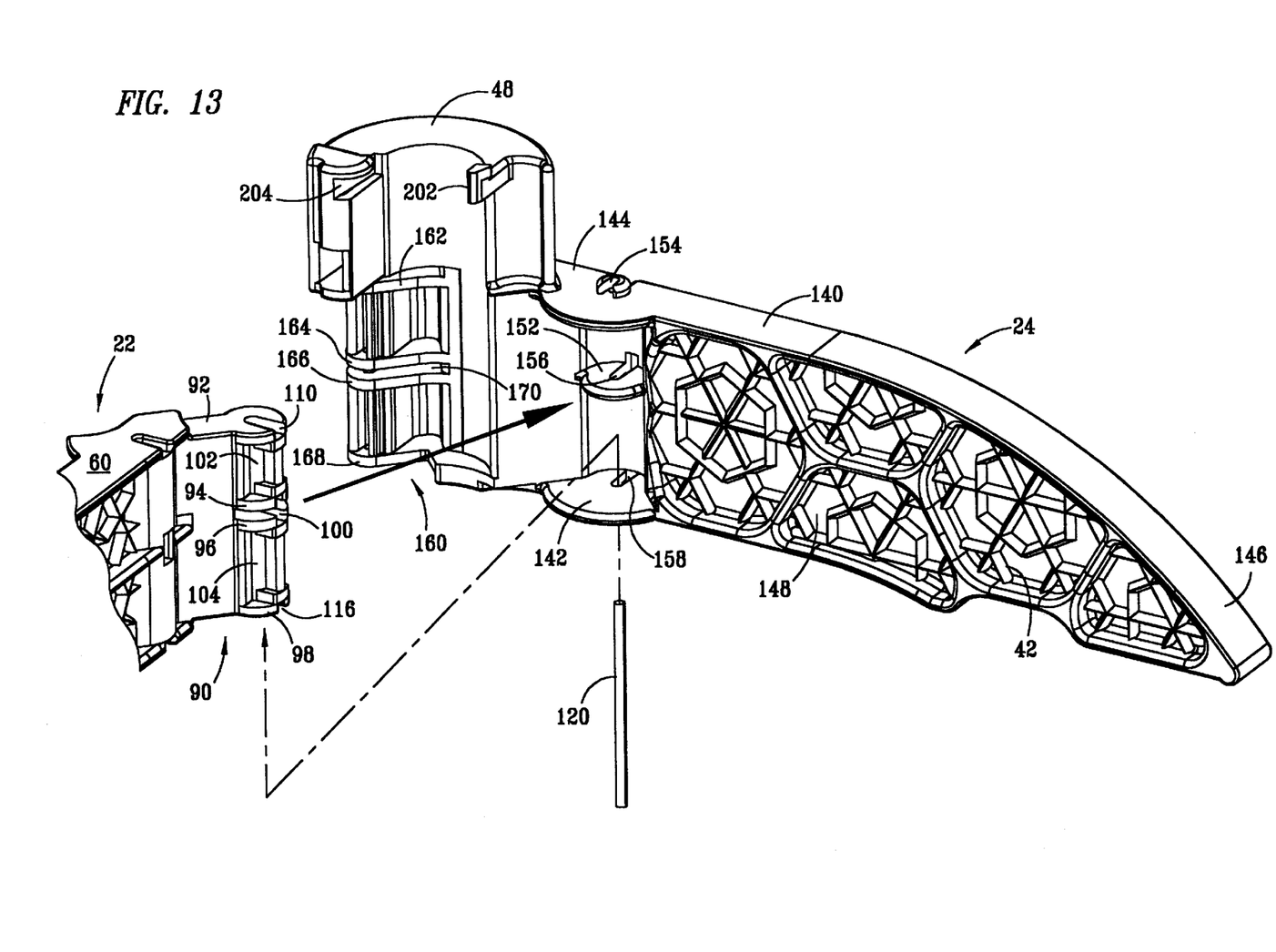
FIG. 13 is a perspective view illustrating the hinge connection between two legs of the present pole stand.

Referring now to FIG. 13, the hinge connection formed between leg 22 and leg 24 and the hinge connection formed between leg 26 and leg 28 will now be described. Hinge 90 is inserted into side wall 148 of legs 24 and 28 such that plate 152 is received within slot 100 of hinge 90. Apertures 110, 112, 114, and 116 (FIG. 8) of hinge member 90 align with apertures 154, 156, and 158 of legs 24 and 28 such that pin 120 pivotally connects hinge member 90 to leg 24 or 28. Pin 120 frictionally engages the apertures through which it passes. In this manner, leg 22 is hingedly connected to leg 24 and leg 26 is hingedly connected to leg 28. Side wall 70 of legs 22 and 26 lie parallel to side wall 148 of legs 24 and 28 in the folded position of stand 20 as illustrated in FIG. 3.

Figure 14:
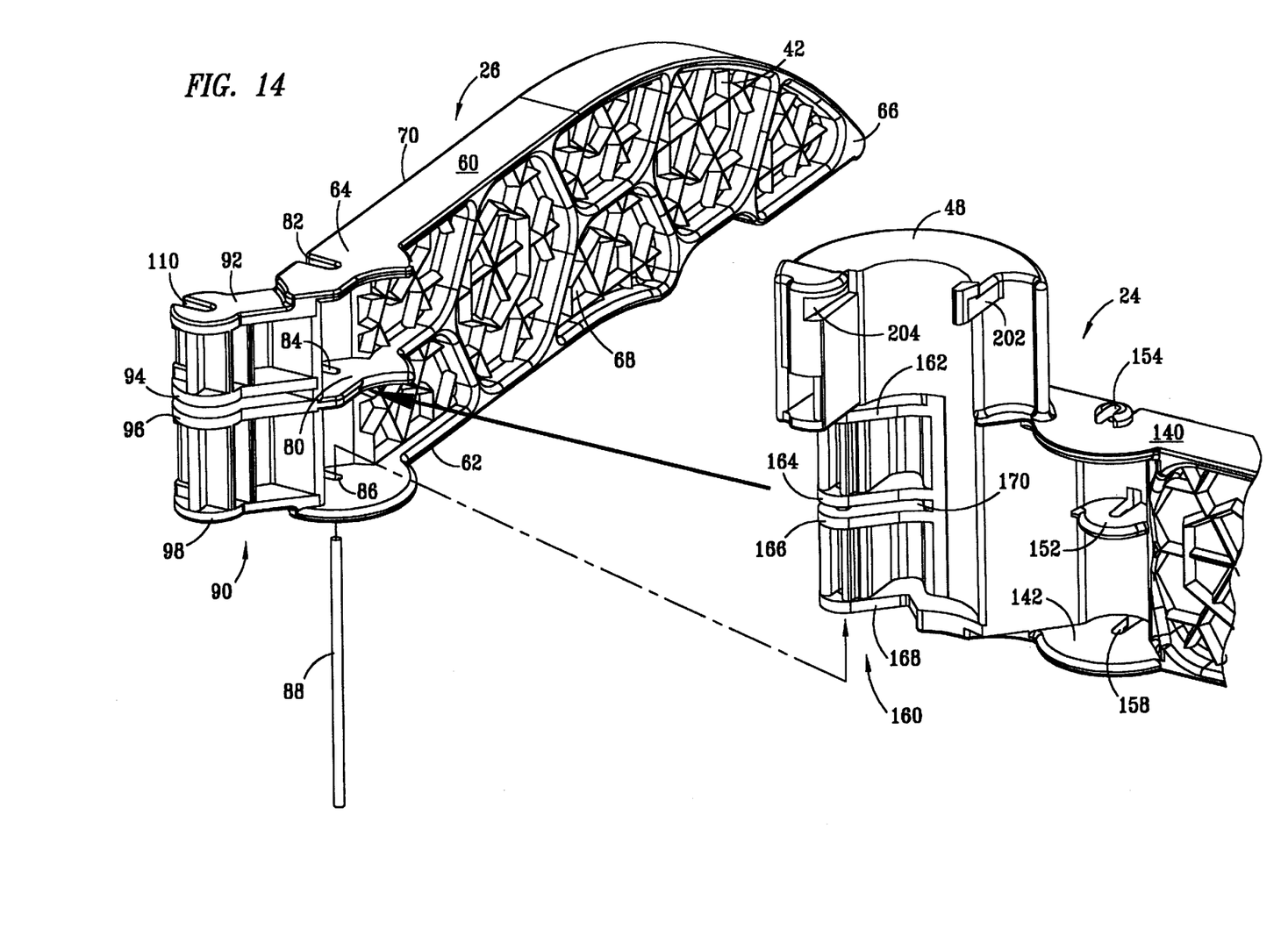
FIG. 14 is a perspective view illustrating the hinge connection between two legs of the present pole stand.

Referring now to FIG. 14, the interconnection between hinge member 160 of legs 24 and 28 and legs 22 and 26 will now be described. Slot 170 of hinge member 160 receives plate 80 of legs 22 and 26. Apertures 82, 84, and 86 of legs 22 and 26 align with apertures 176, 178, 180, and 182 (FIG. 12) of hinge member 160 to receive pin 88 through bottom wall 62. In this manner, leg 24 is hingedly connected to leg 26, and leg 28 is hingedly connected to leg 22 through pin 88. Pin 88 frictionally engages the apertures through which it passes. In the folded position of stand 20, side wall 150 of legs 24 and 28 lie adjacent to side wall 68 of legs 22 and 26.

Referring now to FIGS. 4, 13, and 14, by utilizing pins 88 and 120, legs 22, 24, 26, and 28 are hingedly connected to allow stand 20 to achieve the configuration as shown in FIG. 1 in the stand support position to the folded position as illustrated in FIG. 3. No removal of pins 88 and 120 is required to allow stand 20 to achieve the folded position for storage. Leg 22 is hingedly connected to leg 24 utilizing hinge member 90 and pin 120 (FIG. 13). Leg 24 is hingedly connected to leg 26 utilizing hinge member 160 and pin 88 (FIG. 14). Leg 26 is hingedly connected to leg 28 utilizing hinge member 90 and pin 120. Leg 28 is hingedly connected leg 22 utilizing hinge member 160 and pin 88.

It therefore can be seen that the present foldable stand for supporting a cylindrical shaft is easy to operate between the stand support position and the folded position for storage. The present stand requires no assembly by the user and securely holds a pole such as a pole of an artificial Christmas tree.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A foldable stand for supporting a cylindrical shaft, the stand being operable between a folded position and a stand support position for supporting the shaft, the stand comprising:

first, second, third, and fourth hingedly connected legs, each of said legs having a top wall, a bottom wall, a first end, a second end, a first side wall and a second side wall, said first and second legs being disposed generally parallel to each other in the folded position and generally perpendicular to each other in the stand support position, said third and fourth legs being disposed generally parallel to each other in the folded position and generally perpendicular to each other in the stand support position;

said first side wall of each of said legs including a mounting plate disposed between said top and bottom walls and adjacent said first end of said leg;

each of said legs further including a hinge member extending from said first end; and said second and fourth legs including a receptacle adapted to receive the shaft in the stand support position.

2. The foldable stand of claim 1 wherein said hinge member of said first leg is pivotally connected to said mounting plate of said second leg, said hinge member of said second leg is pivotally connected to said mounting plate of said third leg, said hinge member of said third leg is pivotally connected to said mounting plate of said fourth leg, and said hinge member of said fourth leg is pivotally mounted to said mounting plate of said first leg.

3. The foldable stand of claim 1 wherein each of said hinge members include first and second plates, said first and second plates being spaced apart by a slot, such that one of said mounting plates is disposed within one of said slots of one of said hinges.

4. The foldable stand of claim 1 wherein said second and fourth legs include a semi-circular collar for forming a collar aperture having a diameter adapted to encircle the shaft in the stand support position.

5. The foldable stand of claim 4 wherein said semi-circular collar includes means for locking said semi-circular collars together.

6. The foldable stand of claim 4 and further including an adapter for selective insertion into said collar aperture for receiving a shaft having a diameter less than said diameter of said collar aperture.

7. A foldable stand for supporting a cylindrical shaft, the stand being operable between a folded position and a stand support position for supporting the shaft, the stand comprising:

first, second, third, and fourth hingedly connected legs, said first and second legs being disposed generally parallel to each other in the folded position and generally perpendicular to each other in the stand support position, said third and fourth legs being disposed generally parallel to each other in the folded position and generally perpendicular to each other in the stand support position;

said second and fourth legs including a receptacle adapted to receive the shaft in the stand support position;

each of said legs includes a top wall, a bottom wall, a first end, a second end, a first side wall and a second side wall;

said first side wall of each of said legs includes a mounting plate disposed between said top and bottom walls and adjacent said first end of said leg;

each of said legs further including a hinge member extending from said first end such that said hinge member of said first leg is pivotally connected to said mounting plate of said second leg, said hinge member of said second leg is pivotally connected to said mounting plate of said third leg, said hinge member of said third leg is pivotally connected to said mounting plate of said fourth leg and said hinge member of said fourth leg is pivotally mounted to said mounting plate of said first leg; and each of said hinge members include first and second plates, said first and second plates being spaced apart by a slot such that one of said mounting plates is disposed within said slot of one of said hinges.

8. The foldable stand of claim 7 wherein said second and fourth legs include a semi-circular collar for forming a collar aperture having a diameter adapted to encircle the shaft in the stand support position.

9. The foldable stand of claim 8 wherein said semi-circular collar includes means for locking said semi-circular collars together.

10. The foldable stand of claim 8 and further including an adapter for selective insertion into said collar aperture for receiving a shaft having a diameter less than said diameter of said collar aperture.

* * * * *